US012668327B2

(12) United States Patent
Stegmaier et al.

(10) Patent No.: US 12,668,327 B2
(45) Date of Patent: Jun. 30, 2026

(54) METHOD FOR CONTROLLING A SHIFT SYSTEM OF A BICYCLE

(71) Applicant: Robert Bosch GmbH, Stuttgart (DE)

(72) Inventors: Juergen Stegmaier, Wannweil (DE);
Marten Swetik, Kusterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/782,506

(22) Filed: Jul. 24, 2024

(65) Prior Publication Data

US 2025/0042508 A1 Feb. 6, 2025

(30) Foreign Application Priority Data

Jul. 31, 2023 (DE) ...................... 10 2023 207 297.1

(51) Int. Cl.
*B62M 9/123* (2010.01)
*B62M 6/50* (2010.01)
*B62M 25/08* (2006.01)

(52) U.S. Cl.
CPC ............ *B62M 9/123* (2013.01); *B62M 25/08* (2013.01); *B62M 6/50* (2013.01)

(58) Field of Classification Search
CPC ...... B62M 25/08; B62M 9/123; B62M 9/133; B62M 6/50
See application file for complete search history.

(56) References Cited

U.S. PATENT DOCUMENTS

| | | | |
|---|---|---|---|
| 10,507,885 B2 | 12/2019 | Chen et al. | |
| 11,407,472 B2 | 8/2022 | Shahana et al. | |
| 2019/0202525 A1* | 7/2019 | Shahana | .................. B62M 6/50 |
| 2022/0289334 A1* | 9/2022 | Baumgaertner | ...... G01L 25/003 |

FOREIGN PATENT DOCUMENTS

| | | |
|---|---|---|
| DE | 10 2018 218 167 A1 | 5/2019 |
| EP | 1 864 561 B1 | 5/2013 |

* cited by examiner

*Primary Examiner* — Minnah L Seoh
*Assistant Examiner* — Gregory T Prather
(74) *Attorney, Agent, or Firm* — Maginot, Moore & Beck LLP

(57) ABSTRACT

A method for controlling a shift system of a bicycle includes, in particular during pedaling, (i) acquiring sensor data representing a posture of a rider of the bicycle relative to the bicycle, (ii) recognizing a transition of the rider from a seated position to a standing position based on the sensor data acquired, and (iii) decreasing a gear ratio of the shift system in a controlled manner in response to recognizing the transition of the rider from the seated position to the standing position.

17 Claims, 3 Drawing Sheets

METHOD FOR CONTROLLING A SHIFT SYSTEM OF A BICYCLE

This application claims priority under 35 U.S.C. § 119 to patent application no. DE 10 2023 207 297.1, filed on Jul. 31, 2023 in Germany, the disclosure of which is incorporated herein by reference in its entirety.

BACKGROUND

The present disclosure relates to a method for controlling a shift system of a bicycle, a shift system of a bicycle, and a bicycle.

Shift systems for bicycles that can be electronically actuated are known. The ability to provide automatic actuation of a gear change is provided as a result. For example, certain shift thresholds are provided to trigger such an automatically actuated gear changes. Often, these shifting points are designed to cause effective regulation of a target pedaling frequency. However, optimal riding comfort and efficient operation of the bicycle may not thereby be provided in all riding situations.

SUMMARY

In contrast, the method according to the disclosure having the features set forth below offers the advantage that automatic gear shifting of a gear shifting means of a bicycle can be facilitated in a straightforward manner, whereby a high level of pedaling comfort and a high efficiency can also be reliably provided for a rider of the bicycle in standing riding positions. According to the disclosure, this is achieved by a method for controlling a gear shifting way of a bicycle, comprising the following steps:

acquiring sensor data representing a posture of a rider of the bicycle relative to the bicycle, recognizing a transition of the rider from a seated position to a standing position or from a standing position to a seated position based on the sensor data acquired, and decreasing a gear ratio of the shift system in a controlled manner in response to recognizing the transition of the rider from the seated position to the standing position, or increasing the gear ratio of the shift system in a controlled manner in response to recognizing the transition of the rider from the standing position to the seated position.

In other words, the method recognizes that the rider is assuming or will assume a standing riding position, whereby a gear ratio in the shift system of the bicycle is reduced based on this recognition. In some cases, a longer gear is thus engaged such that, e.g., the pedaling frequency decreases at substantially the same speed. The method also recognizes the reverse situation of the rider assuming or being about to assume a seated riding position, whereby a gear ratio in the shift system of the bicycle is increased based on this recognition.

In other words, a shorter gear is automatically engaged when the rider is sitting in the saddle of the bicycle once again from the standing riding position and continues to pedal in the seated position. In particular, the pedaling frequency can thus be automatically increased, e.g. at a substantially constant speed by the shift system, so that the rider can pedal further at a high level of riding comfort.

The seated position is in particular considered to be a rider posture in which the rider is sitting on a saddle of the bicycle, in particular while the rider is pedaling. In addition, a rider posture in which the rider is not seated on the saddle of the bicycle is considered to be the standing position, in particular during pedaling. Preferably, the standing position is also considered an out-of-saddle position.

Preferably, the controlled reduction of the gear ratio is performed directly in response to recognizing the transition of the rider from the seated position to the standing position. Likewise, the controlled increase of the gear ratio is preferably performed directly in response to recognizing the transition of the rider from the standing position to the seated position.

It is particularly advantageous if the gear ratio has already been reduced before the rider is actually in the standing position.

It is particularly advantageous if a recognition of an impending transition of the rider from the seated position to the standing position is performed, and if the controlled reduction of the gear ratio in response to the recognized impending transition of the rider from the seated position to the standing position is performed.

The method therefore offers the advantage of a shift strategy being provided that can enable optimal operation of the bicycle when the rider transitions from the seated position to the out-of-saddle position, or vice versa. Since the rider can additionally use their total body weight in the standing riding position compared to the seated riding position, e.g. by moving the bicycle back and forth, among other things, a particularly high torque can be applied to a crankshaft of the bicycle in this riding state. By providing a reduced ratio, a higher load torque can in this case be provided and considered compared to pedaling in the seated position. A lower pedaling frequency can thus be provided to the rider, which has a particularly advantageous effect on a high riding comfort during operation. In addition, a particularly efficient operation of the bicycle can also be enabled as a result.

Preferred embodiments of the disclosure are also set forth below.

Preferably, the method further comprises the following step: recognizing a posture of a rider of the bicycle relative to the bicycle based on the sensor data acquired. Using the method, the body position, i.e. the seated position or the standing position, can also be determined, not only the change between the body positions.

Particularly preferably, the controlled reduction of the gear ratio is performed in order to set a predetermined standing pedaling frequency. In other words, the gear ratio is set in a controlled manner by the shift system, e.g. depending on the current speed of the bicycle, such that the predetermined standing pedaling frequency is adjusted. For example, the standing pedaling frequency can be a predefined value, or it can alternatively be predetermined by, e.g., the rider of the bicycle. Alternatively or additionally, in particular in response to recognizing the rider transition from the standing position to the seated position, the controlled increase in the gear ratio can preferably be performed in order to set a predetermined seated pedaling frequency. Preferably, the standing pedaling frequency is less than the seated pedaling frequency, preferentially by at least 5%, preferably at least 10%, relative to the seated pedaling frequency.

Preferably, the controlled reduction of the gear ratio is performed by changing the current gear ratio by a predefined percentage of the ratio amount or by an absolute ratio amount. In other words, the gear ratio is changed by a percentage of the ratio amount, depending on the current ratio, in particular based on the current gear ratio or, alternatively, by an absolute gear ratio amount. Preferably, the percentage of the gear ratio amount or the absolute ratio amount is defined as a function of the different gear stages of the shift system. In other words, for example, the controlled reduction of the gear ratio can be performed such that the system automatically upshifts by a certain number of gears. Alternatively or additionally, in particular in response to recognizing the transition of the rider from the standing position to the seated position, the controlled increase in the gear ratio can preferably be performed by increasing the current gear ratio by a predefined percentage of the gear ratio or absolute gear ratio. As a result, it possible to perform the method in a particularly straightforward and inexpensive manner.

Further preferably, the controlled reduction of the ratio is performed in order to cause a predefined percentage of reduction or absolute reduction of a current pedaling frequency. In other words, the gear ratio is adjusted in such a regulated manner in order to cause a predefined change in the pedaling frequency by the shift, in particular at a substantially constant speed. For example, a reduction of the pedaling frequency by at least 5%, preferably by at least 10%, can be automatically adjusted. Alternatively, for example, a reduction of the pedaling frequency by an amount of at least 5 revolutions/min, preferably by at least 10 revolutions/min, can be caused automatically. Alternatively or additionally, in particular in response to recognizing the transition of the rider from the standing position to the seated position, the controlled increase in the gear ratio can preferably be performed in order to cause a predefined percent of increase or absolute increase in the current pedaling frequency.

Preferably, the shift system is controlled automatically, in particular by way of a control unit and based on a predetermined characteristic shifting profile. For example, a user-specific shifting logic can be considered a shifting profile, whereby shifting thresholds, depending on which gear changes are initiated, are considered depending on certain predetermined parameters, such as roadway characteristics, roadway pitch, support factor of an electric drive unit, user-specific shifting characteristics, or the like. In this case, the controlled reduction of the gear ratio of the shift system when it is recognized that the rider is transitioning from the seated position to the standing position is performed by adjusting the characteristic shift profile. Therefore, operation of the bicycle can be facilitated while enabling a particularly high level of riding comfort for the rider. Alternatively or additionally preferably, in particular in response to the recognition of the transition of the rider from the standing position to the seated position, the controlled increase of the gear ratio can also be performed by a corresponding adjustment of the characteristic shift profile.

Further preferably, the rider's body position is recognized based on sensor data from the bicycle's sensor system. In particular, the sensor system comprises an inertial measurement unit and/or a torque sensor, preferably by way of which a pedal torque of the rider can be acquired, and/or a speed sensor, and/or a pedaling frequency sensor. The change in the rider's posture can thus be easily recognized based on, e.g., characteristic changes in sensor data acquired by the sensor system.

Preferably, the transition of the rider from the seated position to the standing position is recognized in response to a acquisition of a brief pause of the bicycle. In particular, a temporary reduction in speed and/or a brief, significant decrease in the acceleration of the bicycle is considered to be a brief pause. For example, a maximum of one second, preferably 0.5 seconds, can be considered as the time period in this case. Such a brief pause can, e.g., occur due to the transition of the rider from the position to the out-of-saddle position by the rider shifting their center of gravity forward when transitioning in the direction of travel, thus pushing the bicycle rearward relative to their body. The transition from the seated position can therefore ultimately be determined in a simple way, e.g. by way of a speed sensor and/or an inertial measurement unit.

Particularly preferably, the recognition of the transition of the rider from the seated position to the standing position is performed when, at the same time as recognizing the brief pause of the bicycle, braking-free operation of the bicycle is recognized, i.e. when no brakes are being actuated. For example, braking-free operation can be acquired by way of a brake pressure sensor and/or by way of an anti-lock braking system of the bicycle. A particularly reliable recognition of the change in the rider's body position can thus be provided.

Preferably, the rider's transition from the seated to the standing position is recognized in response to an acquisition of a pendulum movement of the bicycle about a longitudinal axis of the bicycle. In particular, an alternating rolling movement of the bicycle about the longitudinal axis is considered a pendulum movement. Advantageously, such a pendulum movement can be acquired by way of an inertial measurement unit. Such a pendulum movement occurs in the out-of-saddle position in particular. A further reliable way of recognizing the rider's posture can therefore be provided.

Preferably, the rider's transition from the seated position to the standing position is recognized in response to an acquisition of a reduction of a current actual pedaling frequency and/or based on an increase of a current pedal torque. In particular, a significant reduction or increase in elevation is considered in this case. A lower pedaling frequency and/or higher pedal torque are, e.g., characteristic of an out-of-saddle position as compared to pedaling in the seated position.

Further preferably, the rider transition from the seated position to the standing position is recognized based on sensor data from a seat occupancy sensor of the bicycle. For example, such a seat occupancy sensor can be configured to acquire a pressure on a seat of the bicycle. A particularly straightforward and unambiguous acquisition of the standing position and the seated position can thus be enabled.

Furthermore, the disclosure leads to a shift system of a bicycle, preferably an electric bicycle comprising a control unit. The control unit is configured to operate a gear shifting means of the shift system, in particular to change a gear ratio of the shift system in a controllable manner. Furthermore, the control unit is configured to perform the method described. Preferably, the gear shifting means comprises a derailleur configured to move a bicycle chain between sprockets of varying size and to thereby alter a gear ratio. Alternatively or additionally, the gear shifting means can preferably comprise a gearshift mechanism. Particularly preferably, the gear shifting means comprises an electronic actuation device, whereby in particular the control unit is configured to actuate the electronic actuation device of the shift control.

The disclosure further relates to a bicycle, preferably an electric bicycle, comprising the shift system described.

BRIEF DESCRIPTION OF THE DRAWINGS

The disclosure is described hereinafter based on exemplary embodiments in connection with the drawings. In the drawings, functionally identical components are respectively denoted by identical reference signs. Shown are.

DETAILED DESCRIPTION

Figure 1:
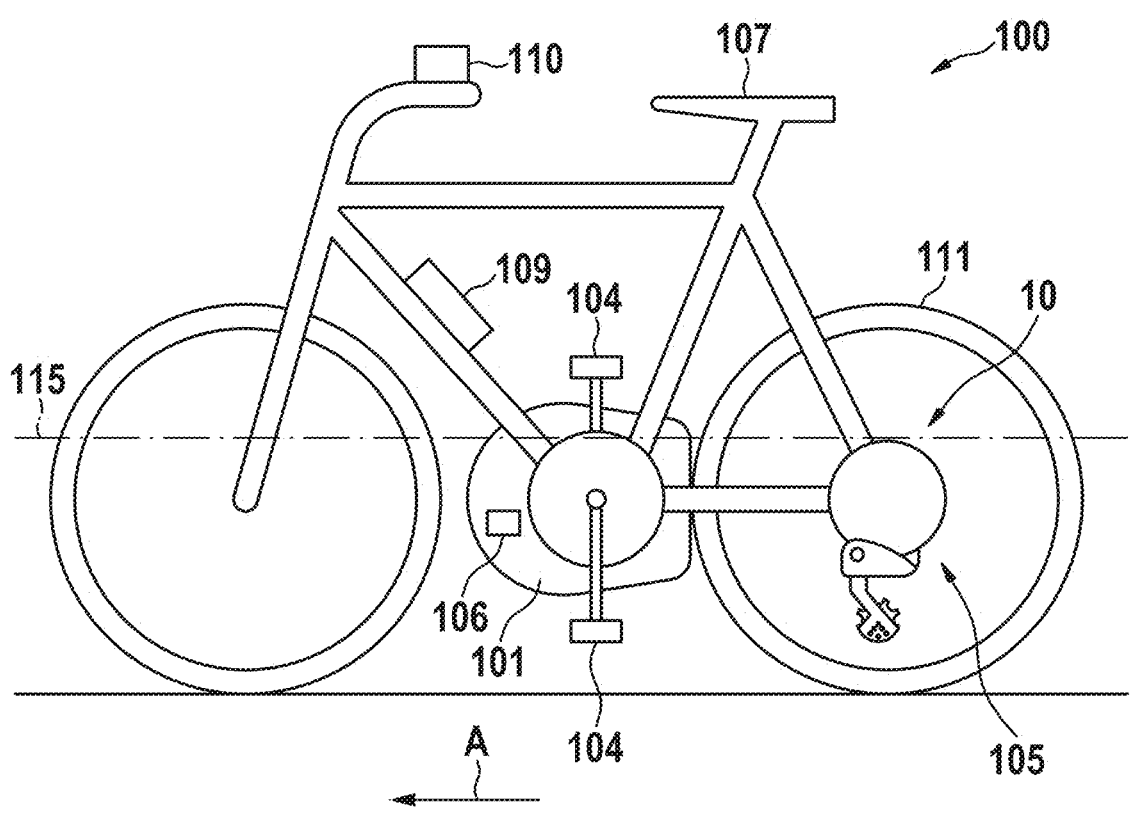
FIG. 1 a simplified schematic view of a bicycle in which a method to control a shift system of the bicycle is performed according to an exemplary embodiment of the disclosure, FIG. 2 a highly simplified schematic view of steps of the method of the first exemplary embodiment, FIG. 3 a simplified schematic view of a seated position while performing the method of the exemplary embodiment, FIG. 4 a simplified schematic view of a standing position while performing the method according to the exemplary embodiment, and FIG. 5 alternative simplified schematic views of the standing position.

FIG. 1 shows a simplified schematic view of a bicycle 100 having a shift system 10 comprising a gear shifting means or mechanism 105 and a control unit 106. The gear shifting means 105 is a chain shift comprising a derailleur and multiple variously sized sprockets, at least on one rear hub of the bicycle 100.

The gear shifting means 105 comprises an electronic actuation device that, in response to receiving electronic actuation signals, causes a gear change, i.e., a change in a ratio in the drive train of the bicycle 100. The electronic actuation signals can be generated by the control unit 106. In particular, automatic switching of the bicycle 100 can thereby be provided.

The bicycle 100 is an electric bicycle which comprises a drive unit 101, in particular comprising an electric motor. Preferably, the control unit 106 is integrated into the drive unit 101. The drive unit 101 can be supplied with electrical energy by way of an electrical energy storage mechanism 109 of the bicycle 100. The drive unit 101 can thereby support the pedal force generated by the muscle power of a rider of the bicycle 100 with motor torque generated by an electric motor.

Figure 3:
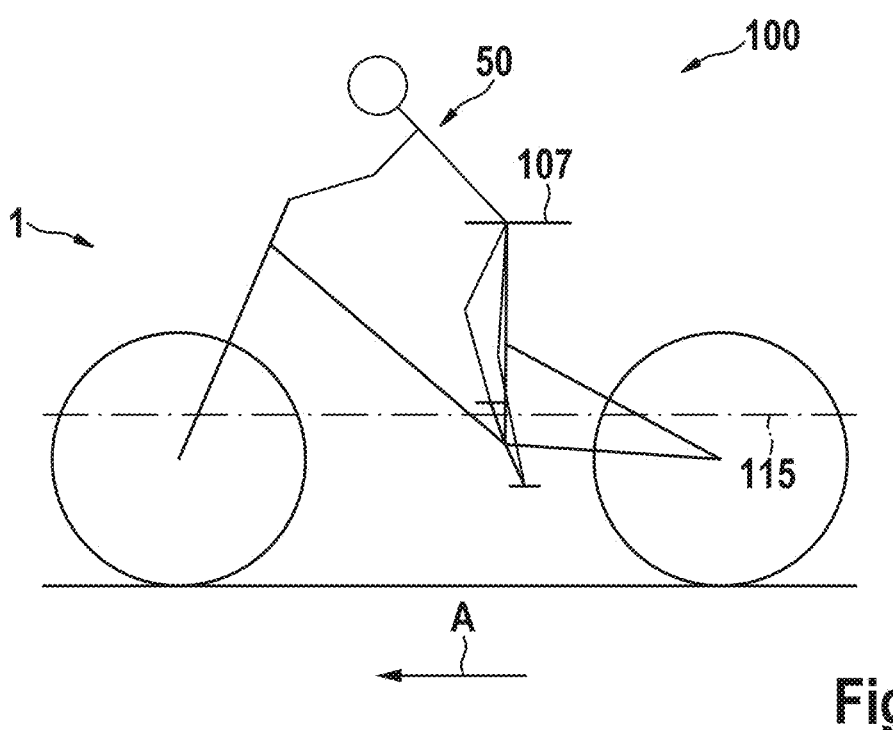
Figure 4:
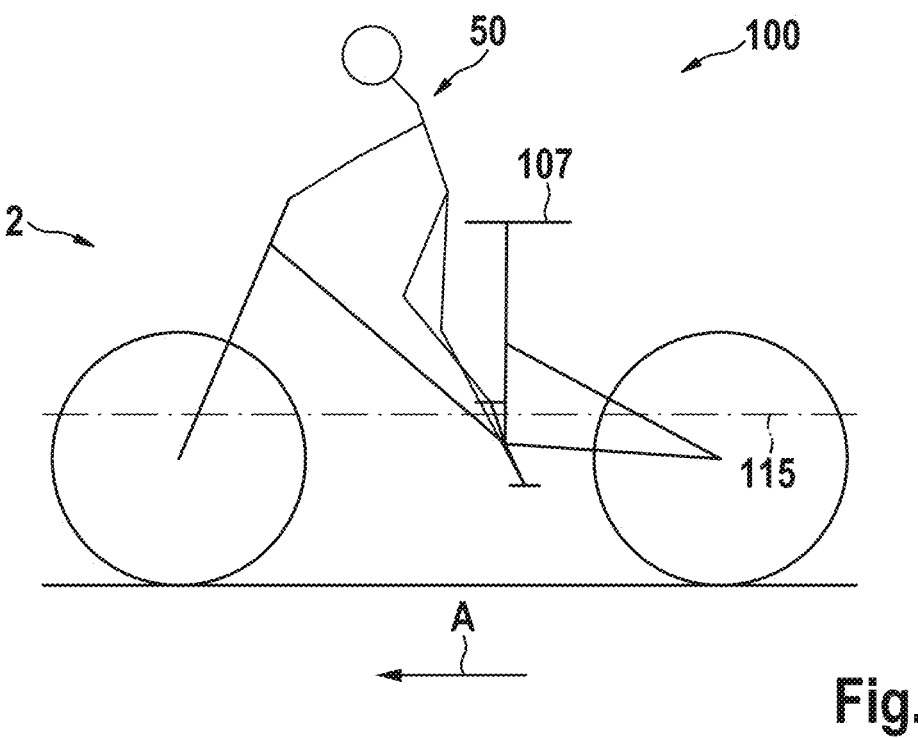
Figure 5:
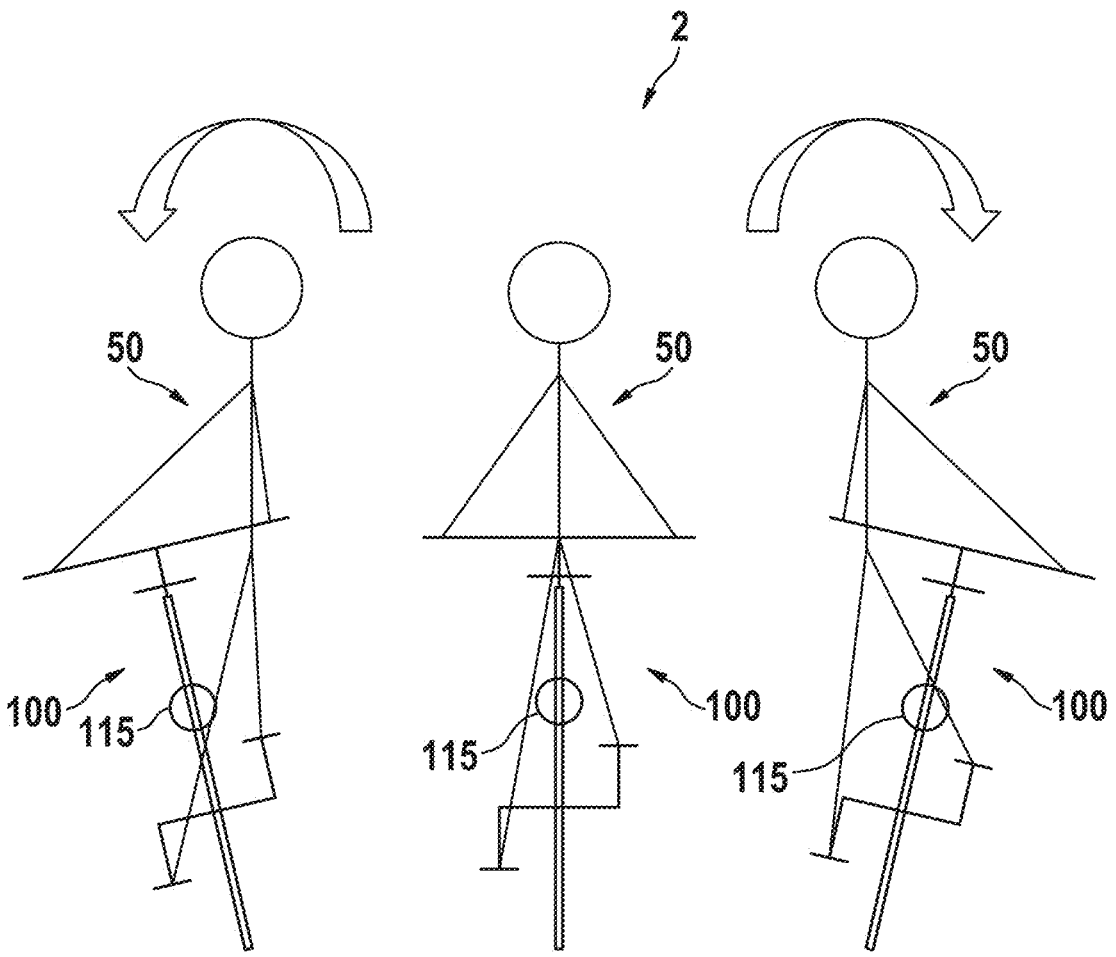

The control unit 106 is in this case configured to perform a method 20 for, in particular, automated control of the gear shifting means 105 of the shift system 10 of the bicycle 100. The method steps of the method 20 are shown in a highly simplified schematic manner in FIG. 2 and are described hereinafter. FIGS. 3 to 5 serve to further explain details of performing the method.

Figure 2:
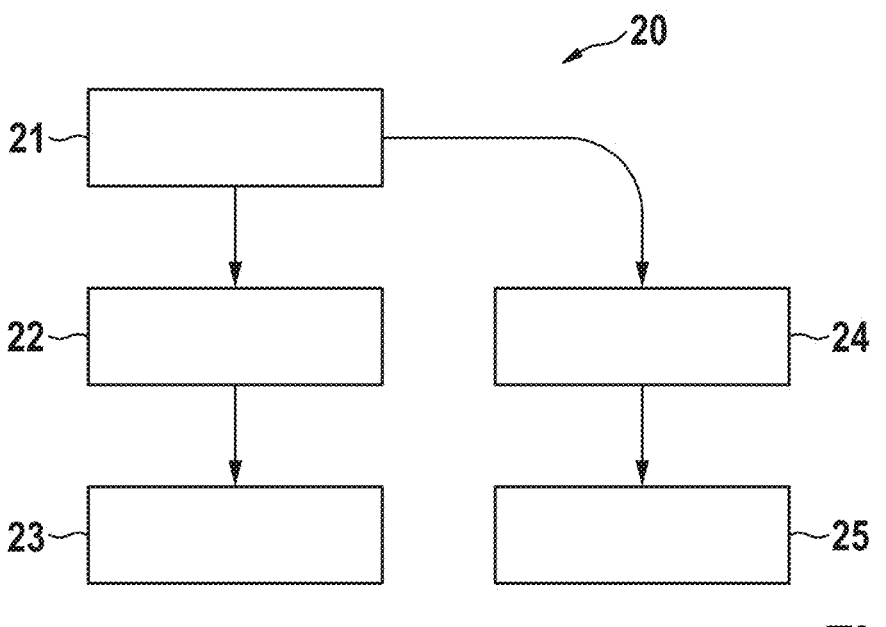

In the exemplary embodiment of the method 20 according to FIG. 2, a first step 21 comprises an acquisition of a posture of a rider 50 of the bicycle 100 relative to the bicycle 100.

In particular, a distinction is made between, preferably precisely, two different body positions of the rider 50, specifically a seated position 1 and a standing position 2 (see FIGS. 3 and 4).

In the seated position 1, the rider 50 is seated on a saddle 107 of the bicycle 100 and pedals in this posture to generate a pedaling torque using the pedals 104, which at least partially serves to propel the bicycle 100.

In the standing position 2, for example, the rider 50 is only standing on the pedals 104 and pedaling without contact with the saddle 107. The standing position 2 can in this case also be referred to as an out-of-saddle position. Among other things, the rider 50 in this case also generates a strong pedal torque by displacing and utilizing their body weight and pivoting the bicycle 100 about its longitudinal axis 115 (see FIG. 5) in order to push the pedals 104 more strongly.

Acquisition of the posture is in this case performed using the sensor system 110 of the bicycle 100. One or more of the acquisition concepts described hereinafter can be used in this case.

For example, a current pedal actuation can be monitored by way of a torque sensor and/or a pedaling frequency sensor of the sensor system 110 and can be recognized based on whether the operator is currently operating the pedals in the seated position 1 or the bridge position 2. Alternatively or additionally preferably, a movement of the bicycle 100 can be monitored by way of an inertial measurement unit, and the posture the rider 50 is currently assuming on the bicycle 100 can be determined on this basis.

Based on the posture acquired, a transition of the rider 50 from the seated position 1 to the standing position 2 is recognized during the next step 22 of the method 20.

This transition can, e.g., be recognized by way of a speed sensor and/or the inertial measurement unit in particular to acquire a brief pause of the bicycle 100 based on the weight displacement of the rider 50 relative to the bicycle 100 when the rider rises to the standing position 2.

Preferably, the recognition in step 22 is performed in accordance with the preceding paragraph only when there is simultaneous braking-free operation of the bicycle 100. Braking-free operation can, e.g., be determined by way of a brake pressure sensor and/or an anti-lock braking system.

Alternatively or additionally, the transition from the seated position 1 to the standing position 2 can be recognized based on an acquired pendulum movement of the bicycle 100 about a longitudinal bicycle axis 115. The bicycle longitudinal axis 115 extends in this case substantially along a direction of travel A of the bicycle 100.

Such a pendulum movement is illustrated by way of example in FIG. 5, in which three positions during an out-of-saddle position, i.e. in the standing position 2, respectively, are shown. In this case, the rider 50 moves the bicycle 100 relative to their center of gravity during pedaling by an average normal position (shown in the center of FIG. 5). The positions shown in FIG. 5, left and right, show exemplary left-sided and right-sided end positions of this pendulum movement.

This pendulum motion can be acquired in a straightforward and reliable manner using the inertial sensor system of the bicycle 100.

Further alternatively or additionally preferably, the transition of the rider 50 from the seated position 1 to the standing position can be based on acquisition of a reduction of a current actual pedaling frequency and/or an increase of a current actual pedal torque. A reduction in the actual pedaling frequency and an increase in actual pedal torque are, e.g., characteristic changes in the manner in which the pedals 104 are actuated when transitioning from pedaling in the seated position 1 into an out-of-saddle position.

Another particularly straightforward way of recognizing the transition of the rider from the seated position 1 to the standing position 2 can alternatively or additionally be performed by a seat occupancy sensor of the bicycle 100. Such a seat occupancy sensor can, e.g., be arranged in the saddle 107 of the bicycle 100 and can directly acquire, e.g. based on pressure recognition, whether or not the rider 50 is seated on the saddle 107.

If a transition of the rider from the seated position 1 to the standing position 2 has been recognized, particularly preferably even before the rider 50 is actually in the standing position 2, then controlled actuation of the shift system 10 of the bicycle 100 is performed by the control unit 106 in step 23 of the method 20 in order to reduce a gear ratio of the shift system 10. In other words, a longer gear is engaged, using which (e.g., assuming a consistent speed) the pedaling frequency is reduced by way of the mechanical context of the powertrain of the bicycle 100. As a result, an advantageous actuation of the drive of the bicycle 100 can be facilitated in the out-of-saddle position, since the adjusted longer gear ratio can provide more comfortable pedaling and increased efficiency can also be provided in the standing position 2. As a result of automatically adjusting the ratio by the control unit 106, a particularly high level of ride comfort can be provided to the operator 50 of the bicycle 100 because doing so can provide an optimized adjustment of the ratio to the operator 50 posture at any time, in particular in a timely manner.

Preferably, the gear ratio is in this case reduced such that the current pedaling frequency is reduced by a predefined percentage reduction. For example, assuming consistent speed of the bicycle 100, a 10% reduction in pedaling frequency can be initiated by preferably adjusting the shift system 10 to a correspondingly lower target-standing pedaling frequency.

Alternatively, a predetermined standing pedaling frequency can be set directly which is, e.g., stored as a predefined value, or alternatively, can preferably be defined by the rider 50.

A further advantageous variant can be achieved by using the control unit 106 to perform the adjustment of a characteristic shift profile of the automatic shifting of the bicycle 100 in order to reduce the gear ratio in a controlled manner. For example, shifting thresholds calculated from the shifting profile can be adjusted by the control unit 106.

In addition, in method 20, the gear ratio of the shift system 10 is adjusted in a controlled manner, even if the body position is changed inversely, i.e., when a transition of the rider 50 from the standing position 2 to the seated position 1 is recognized. This recognition is performed during step 24 (see FIG. 2).

If such a transition back to the seated position 1 is recognized, then a controlled increase in the gear ratio of the shift system 10 is performed during step 25, preferably inversely and in a manner similar to the controlled decrease during the transition from the seated position 1 to the standing position 2 described hereinabove.

What is claimed is:

1. A method for controlling a shift system of a bicycle, comprising:
    acquiring sensor data representing a posture of a rider of the bicycle relative to the bicycle;
    recognizing a transition of the rider from a seated position to a standing position, or from the standing position to the seated position, based on the sensor data acquired; and
    decreasing a gear ratio of the shift system in a controlled manner in response to recognizing the transition of the rider from the seated position to the standing position, or increasing the gear ratio of the shift system in a controlled manner in response to recognizing the transition of the rider from the standing position to the seated position,
    wherein the controlled decrease and/or increase in the gear ratio is performed so as to set a target pedaling frequency that is an increase and/or decrease of a predefined percent or absolute amount compared to a current pedaling frequency.

2. The method according to claim 1, further comprising:
    recognizing the posture of the rider of the bicycle relative to the bicycle based on the sensor data acquired.

3. The method according to claim 1, wherein the sensor data representing the posture of the rider is acquired from a sensor system.

4. A method according to claim 3, wherein the recognition of the transition of the rider from the seated position to the standing position is performed in response to an acquisition of sensor data representing a pendulum movement of the bicycle about a longitudinal axis of the bicycle.

5. The method according to claim 3, wherein the recognition of the transition of the rider from the seated position to the standing position is performed in response to an acquisition of sensor data representing a reduction of a current actual pedaling frequency and/or an increase of a current actual pedal torque.

6. The method according to claim 1, wherein the sensor data upon which recognition of the transition of the rider from the seated position to the standing position is based is obtained from a seat occupancy sensor of the bicycle.

7. The shift system of the bicycle, the shift system being configured to execute the method according to claim 1, the shift system comprising:
    a gear shifting mechanism; and
    a control unit configured to operate the gear shifting mechanism to perform the method.

8. An electric bicycle configured to execute the method according to claim 1, the electric bicycle comprising:
    the shift system, which comprises:
        a gear shifting mechanism; and
        a control unit configured to operate the gear shifting mechanism to perform the method.

9. The method of claim 1, wherein the method is performed while the rider is pedaling the bicycle.

10. The method according to claim 1, wherein the acquisition of the sensor data representing the rider's posture is performed based on sensor data from at least one of an inertial measurement unit, a torque sensor, a speed sensor, and a pedaling frequency sensor.

11. The method according to claim 1, wherein the controlled decrease and/or increase in the gear ratio is configured such that the target pedaling frequency is an increase or decrease of at least 5% of the current pedaling frequency or an increase or decrease of at least 5 revolutions/min.

12. The method according to claim 1, wherein the controlled decrease and/or increase in the gear ratio is configured such that the target pedaling frequency is an increase or decrease of at least 10% of the current pedaling frequency or an increase or decrease of at least 10 revolutions/min.

13. A method for controlling a shift system of a bicycle, comprising:
    acquiring sensor data representing a posture of a rider of the bicycle relative to the bicycle;
    recognizing a transition of the rider from a seated position to a standing position, or from the standing position to the seated position, based on the sensor data acquired; and
    decreasing a gear ratio of the shift system in a controlled manner in response to recognizing the transition of the rider from the seated position to the standing position, or increasing the gear ratio of the shift system in a controlled manner in response to recognizing the transition of the rider from the standing position to the seated position,
    wherein:
        an automatic activation of the shift system is performed based on predetermined characteristic shifting profiles, and the controlled decrease and/or increase of the gear ratio of the shift system is performed by an adjustment between a predetermined standing characteristic shifting profile and a predetermined sitting characteristic shifting profile of the predetermined shifting profiles.

14. A method for controlling a shift system of a bicycle, comprising:

acquiring sensor data representing a posture of a rider of the bicycle relative to the bicycle;

recognizing a transition of the rider from a seated position to a standing position, or from the standing position to the seated position, based on the sensor data acquired; and decreasing a gear ratio of the shift system in a controlled manner in response to recognizing the transition of the rider from the seated position to the standing position, or increasing the gear ratio of the shift system in a controlled manner in response to recognizing the transition of the rider from the standing position to the seated position, wherein the recognition of the rider's transition from the seated position to the standing position is performed in response to an acquisition of sensor data representing a brief pause of the bicycle, and wherein the recognition of the transition of the rider from the seated position to the standing position is performed in response to a simultaneous recognition of the sensor data representing the brief pause of the bicycle and sensor data representing braking-free operation of the bicycle.

15. The method according to claim 14, wherein the brief pause is recognized based on a temporary reduction in speed and/or a brief, significant, decrease in acceleration of the bicycle, and the brief pause occurs for a maximum of one second.

16. The method according to claim 15, wherein the brief, significant, decrease in acceleration of the bicycle is greater in significance than repeated decreases in acceleration occurring between pushes of pedals during a normal pedaling cadence.

17. The method according to claim 14, wherein the brief pause occurs for a maximum of one second.

* * * * *